F. SIMPSON & A. R. T. WOODS.
APPARATUS FOR MEASURING THE FLOW OF LIQUIDS IN CLOSED CONDUITS.
APPLICATION FILED MAR. 18, 1911.
1,132,399.
Patented Mar. 16, 1915.
2 SHEETS—SHEET 1.
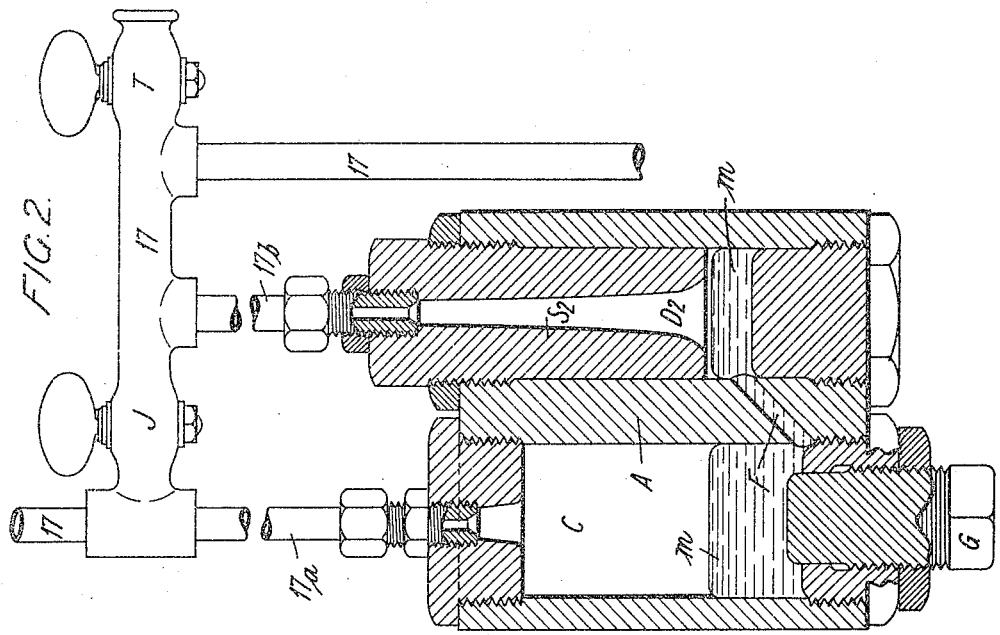
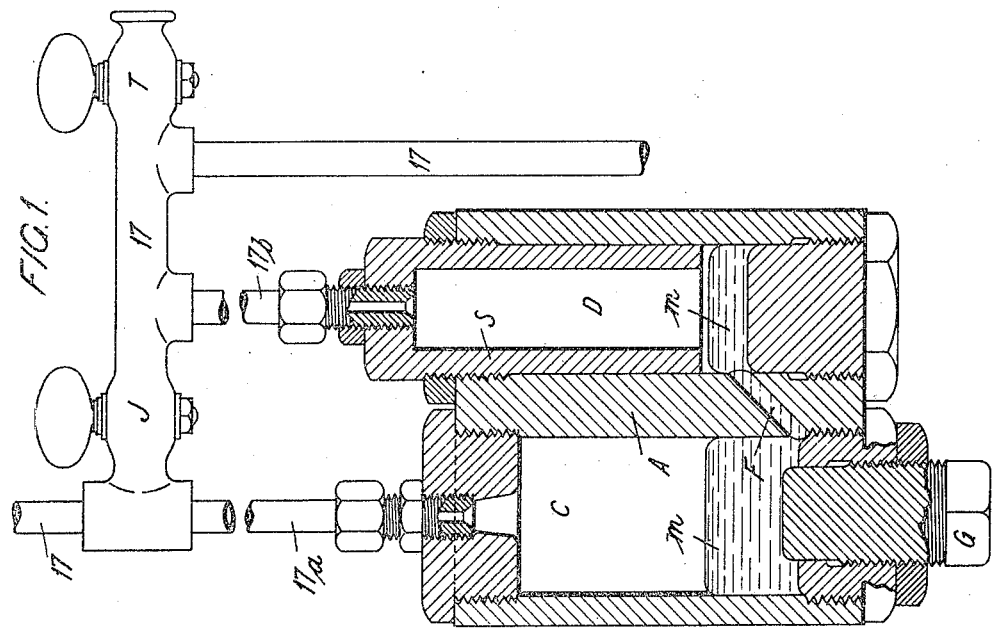
Attest:
Edw. L. Tolson
Edward N. Saxton
Inventors:
Fred Simpson,
Arthur R. T. Woods,
by Spear, Middleton, Donaldson & Spear
Attys.

F. SIMPSON & A. R. T. WOODS.
APPARATUS FOR MEASURING THE FLOW OF LIQUIDS IN CLOSED CONDUITS.
APPLICATION FILED MAR. 18, 1911.
1,132,399.
Patented Mar. 16, 1915.
2 SHEETS—SHEET 2.
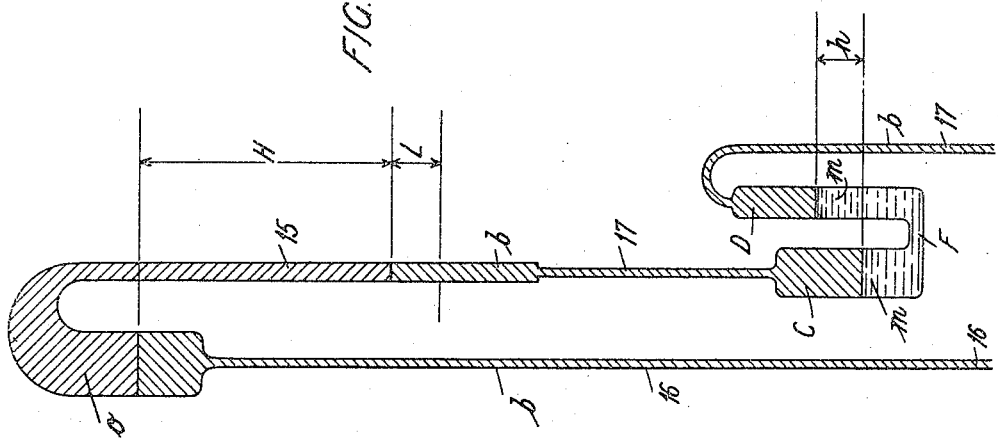
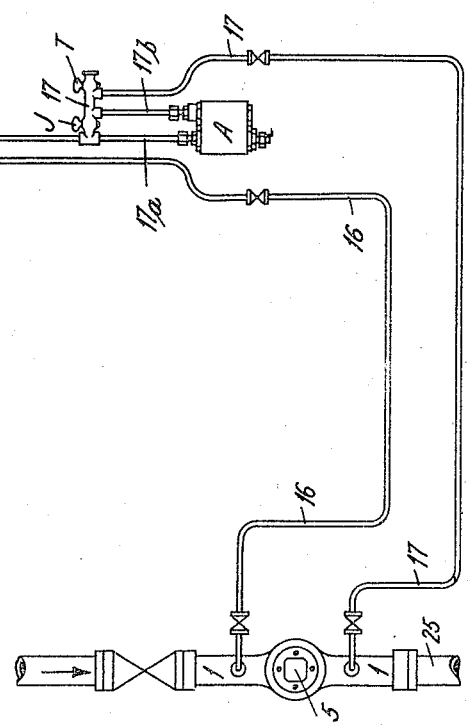
Attest:
Ewd L. Tolson
Edward N. Stanton
Inventors:
Fred Simpson,
Arthur R. T. Woods
by Spear, Middleton, Donaldson & Spear
Attys.

UNITED STATES PATENT OFFICE.

FRED SIMPSON, OF BLUNDELLSANDS, NEAR LIVERPOOL, AND ARTHUR R. T. WOODS, OF HARROW, NEAR LONDON, ENGLAND.

APPARATUS FOR MEASURING THE FLOW OF LIQUIDS IN CLOSED CONDUITS.

1,132,399.	Specification of Letters Patent.	Patented Mar. 16, 1915.

Application filed March 18, 1911. Serial No. 615,334.

*To all whom it may concern:*

Be it known that we, FRED SIMPSON, a subject of the King of Great Britain, and residing in Blundellsands, near Liverpool, England, and ARTHUR ROBERT THOMAS WOODS, a subject of the King of Great Britain, and residing in Harrow, near London, England, have invented certain new and useful Improvements in Apparatus for Measuring the Flow of Liquids in Closed Conduits, of which the following is a specification.

This invention comprises certain improvements applicable to our prior invention for which we have made an application for Letters Patent of the United States, filed September 12th, 1910, Serial No. 581,513, which is now Patent #1,068,280 of July 20, 1913. In our said prior specification we have described an arrangement for measuring the rate of flow of a liquid in a closed conduit such as a brine circulating circuit and for measuring leakage and the amount of imprisoned air therein; the arrangement comprising broadly an obstruent in the circuit, a U gage connected by small pressure tubes to the circuit pipe on opposite sides of the obstruent, for measuring the loss of head or the velocity of the flowing liquid in passing the obstruent, and a smaller obstruent arranged as a by-pass in the gage circuit, so as to provide an alternative path to the main obstruent.

The obstruent is preferably in the form of a diametral bar fixed across the pipe circuit either directly or in a cock plug. The bar may be of any desired cross section such as a trapezoid or a circle, and for calibration purposes, means are provided for varying its effective dimensions, as for instance, making it of taper form and axially adjustable across the pipe bore.

Our present invention has reference to a mercurial device to be used in connection with the gage, the objects being to increase the pressure range of the gage without increasing its length, and to adapt the gage in a more improved manner to read velocities of flow instead of loss of head.

We have illustrated our invention in the accompanying drawings, in which—

Figure 1 shows in vertical section the mercurial device in the form adapted to increase the pressure range of the gage, and Fig. 2 shows the modification thereof adapted to give gage readings such that equal lengths on the gage scale indicate equal increments in the velocity. Fig. 3 shows how the mercurial device is arranged in relation to the gage, and Fig. 4 is a diagrammatic view, not to scale, to explain the action.

It will be well to refer in the first place to Fig. 3, in which the relevant parts of our apparatus, as described in our prior specification aforesaid, are shown with the mercurial device, which is the subject of our present invention, incorporated. Such parts as are common to our prior specification are correspondingly numbered,—that is to say;—1 is the section of the circuit or pipe 25 in which the velocity of flow of the liquid, say brine, is to be measured, 5 is the obstruent therein and 15 is the gage, the function of which is to measure the fall of head or pressure of the brine in passing the obstruent, for which purpose the legs of the gage are connected respectively to points in advance and in rear of the obstruent by the small pressure tubes 16 and 17. The gage 15 is of the inverted U type, the bend above the brine columns being filled with a liquid of lower specific gravity than the brine, and not miscible therewith, such for instance as paraffin oil colored red.

The gage is preferably made with one leg of comparatively large diameter at the brine level therein so that practically all the variation in the head is shown in the other leg,— the right leg in the drawings.

It will be understood that the tube 16 transmits the major pressure to the gage and the tube 17 the minor pressure, the gage measuring the difference of these pressures which may be termed E.

If B and O be the respective multipliers to convert heads of brine and oil into pressure, then for a given value of E, the head shown in the gage 15 without the mercurial device would be $$\frac{E}{B-O}$$

and for a considerable value of E, the head would be inconveniently large. The object of the mercurial device shown in Fig. 1 is to reduce the value of the head for a given value of E so as to adapt a gage of moderate height to deal with large values of E.

Referring now to Fig. 1, A is a casting forming in effect a U tube, the legs C and D communicating through the cross passage F. The legs contain mercury $m$, and the level thereof can be adjusted by the screwed plug G.

Tubes $17^a$ and $17^b$ enter fluid-tightly into the tops of the legs, and these tubes lead into the gage tube 17, a stop cock J being interposed in the tube 17 between its junctions with the tubes $17^a$ and $17^b$.

T is a cock in the tube 17 opening to the atmosphere, and is kept normally closed. It will be seen that when the cock J is closed, the device A is thrown into the run of the tube 17, or in other words, it is put in series with the gage and the condition is as shown in the diagram Fig. 4.

The apparatus being entirely filled with liquids, (the letters $b$, $c$ and $m$ indicate, respectively, the brine, oil and mercury), all the brine which may be expelled from the gage leg 15 must enter the leg C.

Let $H$ = the head shown in the gage 15,
$h$ = the head of mercury,
$M$ = multiplier to convert head of mercury into pressure, Then $E = (B-O) \times H + (M-B) \times h$.

The pressure E being thus balanced by the combined heads of brine (and oil) in the gage 15 and of mercury in the device A, it is obvious that for a given value of E, H will be less than it would be if the device A were not introduced; in other words, the pressure value of a given length of the gage scale is increased and it is adapted to deal with greater pressures.

The pressure value so given to the scale of the gage 15 depends not only on the factors B, O and M already mentioned, but also on the ratios P, Q and R, where $$P = \frac{\text{cross sectional area of large leg of gage 15}}{\text{cross sectional area of small leg of gage 15}}$$

$$Q = \frac{\text{cross sectional area of leg C}}{\text{cross sectional area of small leg of gage}}$$

$$R = \frac{\text{cross sectional area of leg D}}{\text{cross sectional area of leg C}}$$

Let E increase by the amount $\triangle E$, and as a result, let the brine fall in the small gage leg by the amount L (see Fig. 4). Then the brine will rise in the large gage leg by the amount $\frac{L}{P}$ and the head H will increase by the amount $$L + \frac{L}{P} = L\left(1 + \frac{1}{P}\right)$$

The brine expelled from the gage will lower the mercury in the leg C by the amount $$L \times \frac{1}{Q},$$

and this will raise the mercury in the leg D by the amount $$L \times \frac{1}{Q} \times \frac{1}{R} = L \times \frac{1}{QR},$$

and the mercury head will thus increase by the amount $$\left(L \times \frac{1}{Q}\right) + \left(L \times \frac{1}{QR}\right) = L \times \left(\frac{1}{Q} + \frac{1}{QR}\right).$$

$\triangle E$ is balanced by the combined increases in the two heads and thus $$\triangle E = (B-O) \times L\left(1 + \frac{1}{P}\right) + (M-B) \times L\left(\frac{1}{Q} + \frac{1}{QR}\right)$$

From this equation the value of L for a given value of $\triangle E$ can be determined, and it may be given any value, within limits, by suitably choosing the arbitrary factors P, Q and R.

The device A can obviously be by-passed and so rendered inoperative by opening the cock J, the head shown in the gage being then, as previously stated, equal to $$\frac{E}{B-O}.$$

The liner S can be exchanged for another of different bore so as to give a different value to the ratio R.

So long as the ratios Q and R are constant, the scalar lengths will be proportional to the value of E.

The velocity of the liquid is related to E by an equation of the form $$V = K\sqrt{E},$$

where K is a constant, and the velocities may be translated from the gage readings by means of a suitable table of corresponding values of E and V. It is obvious, however, that by varying the values of Q or R, or both, at different levels in the legs C and D, the brine level in the gage 15 may be made to vary with change of E in such manner that equal spaces on the scale correspond with equal changes of velocity,—within limits. To attain this result it is only necessary to modify the device shown in Fig. 1 by substituting a suitably curved profile for the cylindrical profile of one or both of the legs C, D. This modification is shown in Fig. 2, the liner $S^2$ being now made with a bore of curved profile forming the leg $D^2$.

The particular dimensions and form of the curve will depend upon the conditions of the case, and from a consideration of the equation giving the value of $\triangle E$, ordinates of the curve can be determined at various heights, or the equation to the curve can be deduced.

While we have described our invention with reference to its application to a refrigerating brine circuit, it is, of course, not limited to such application, and may be used generally for measuring the velocity or quantity of a liquid flowing through a pipe.

It will be understood that it is essential to the proper action of our invention that the gage 15 should be entirely filled with liquid so as to insure equality in the volumes interchanged between the various legs of the gage and the U tube, and this is the meaning which we attach to the words "a liquid pressure measuring gage of the type referred to" which occur in the claims.

Having now fully described our invention, what we claim and desire to secure by Letters Patent is:—

1. In combination; a liquid pressure measuring gage of the type referred to, a U tube containing mercury, a pair of tubes connecting the respective legs of the U tube to one leg of the gage, and a by-pass cock, located in the latter leg between its junctions with the said pair of tubes; substantially as described.

2. In combination; a liquid pressure measuring gage of the type referred to, a U tube containing mercury arranged in series with one leg of the gage, and a detachable liner fitted fluid-tightly in one or both legs of the U tube, so that the proportions or forms of the legs thereof can be readily altered; substantially as described.

3. In combination; a liquid pressure measuring gage of the type referred to, and a U tube containing mercury arranged in series with one leg of the said gage, one or both legs of the said U tube being of varying cross sectional area so that the length of the gage readings may be made proportional to any desired function of the pressure; substantially as described.

4. In combination; a liquid pressure measuring gage of the type referred to, a U tube containing mercury with one or both legs of varying cross sectional area, a pair of tubes connecting the respective legs of the U tube to one leg of the gage, and a by-pass cock located in the latter leg between its junctions with the said pair of tubes; substantially as described.

In testimony whereof, we affix our signatures in the presence of two witnesses.

FRED SIMPSON.
ARTHUR R. T. WOODS.

Witnesses:
J. E. LLOYD SAMES,
JOSEPH E. HIRSH.